E. W. Bancroft,
Lubricator.
Nº 43,000. Patented June 7, 1864.
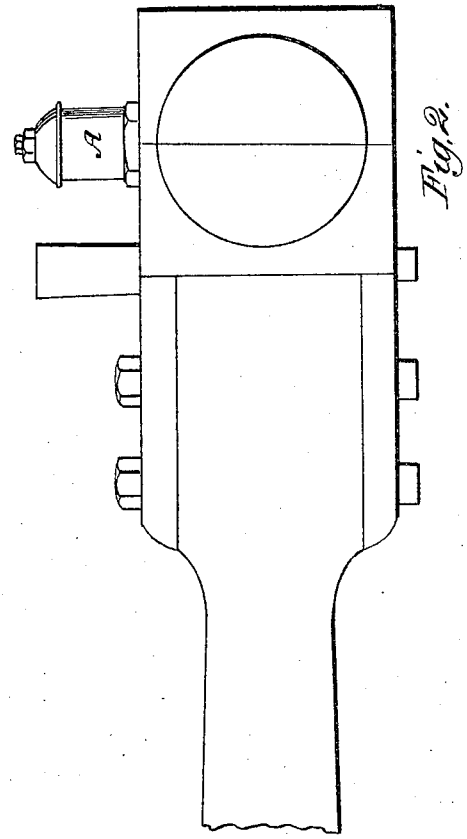
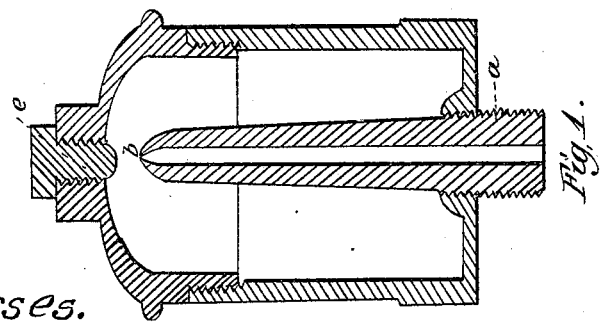
Witnesses.
Inventor.
E. W. Bancroft.

UNITED STATES PATENT OFFICE.

E. W. BANCROFT, OF COLUMBUS, OHIO.

IMPROVEMENT IN OIL-CUPS.

Specification forming part of Letters Patent No. 43,000, dated June 7, 1864.

*To all whom it may concern:*

Be it known that I, E. W. BANCROFT, of the city of Columbus, in the county of Franklin and State of Ohio, have invented a new and Improved Oil Cup for Locomotives and other Rapid Moving Machinery ; and I do hereby declare that the following is a full and exact description thereof, reference being had to the accompanying drawings, and to the letters of reference marked thereon.

The nature of my invention consists in providing a cup or vessel (on the connecting-rods or other suitable parts of machinery) containing a supply of oil, which is gradually fed to the journals through a tube, having a small orifice placed near the top of the cup to prevent its becoming foul.

A mechanic of ordinary skill can make and use my invention from the following description.

Figure 1 is a section of the cup, which has a tube, $a$, rising in the center, a small hole, $b$, of size adapted to the required " feed " or supply of oil. The cup is screwed on the connecting-rods, as shown in Fig. 2, $a$, and by the revolutions of the machinery the oil is dashed over the top of this tube, and a small portion entering the hole $b$, Fig. 1, flows down to lubricate the journal. The cup is filled with oil through a mouth, $c$, Fig. 1, which is closed by a nut-cup screwed into it.

What I claim as my invention, and desire to secure by Letters Patent, is—

The tube with the small perforation at the top, by means of which the oil is gradually fed to the machinery, substantially as shown and described.

E. W. BANCROFT.

Witnesses:
    PHIL. D. FISHER,
    S. D. MARCHER.